US008564691B2

(12) United States Patent
Tsuda et al.

(10) Patent No.: US 8,564,691 B2
(45) Date of Patent: Oct. 22, 2013

(54) DIGITAL CAMERA AND IMAGE COMBINATION DEVICE

(75) Inventors: Yutaka Tsuda, Tokyo (JP); Hidehiro Ogawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/529,652

(22) Filed: Jun. 21, 2012

(65) Prior Publication Data

US 2012/0262605 A1    Oct. 18, 2012

Related U.S. Application Data

(63) Continuation of application No. 11/666,081, filed as application No. PCT/JP2005/019284 on Oct. 20, 2005, now abandoned.

(30) Foreign Application Priority Data

Oct. 26, 2004  (JP) ................................. 2004-310301
Jan. 5, 2005   (JP) ................................. 2005-000779
Jun. 13, 2005  (JP) ................................. 2005-172215

(51) Int. Cl.
*H04N 5/235*    (2006.01)
*H04N 5/20*     (2006.01)

(52) U.S. Cl.
USPC ....................................... 348/230.1; 348/255

(58) Field of Classification Search
None
See application file for complete search history.

(56) References Cited

U.S. PATENT DOCUMENTS

| 5,661,823 | A | 8/1997 | Yamauchi et al. |
| 5,812,703 | A | 9/1998 | Juen et al. |
| 6,292,593 | B1 * | 9/2001 | Nako et al. ................. 382/284 |
| 6,677,992 | B1 * | 1/2004 | Matsumoto et al. ....... 348/229.1 |
| 6,747,694 | B1 | 6/2004 | Nishikawa et al. |
| 7,239,342 | B2 | 7/2007 | Kingetsu et al. |
| 7,649,555 | B2 | 1/2010 | Suzuki |
| 2002/0140827 | A1 * | 10/2002 | Okisu et al. ................ 348/222.1 |
| 2005/0248660 | A1 * | 11/2005 | Stavely et al. ............ 348/208.16 |

FOREIGN PATENT DOCUMENTS

| EP | 0 912 047 A2 | 4/1999 |
| JP | A 1-177282 | 7/1989 |
| JP | A 3-117181 | 5/1991 |
| JP | A 5-37851 | 2/1993 |
| JP | A 5-276431 | 10/1993 |
| JP | A 6-22267 | 1/1994 |
| JP | A-2001-054009 | 2/2001 |

(Continued)

OTHER PUBLICATIONS

Office Action dated Sep. 29, 2010 issued in U.S. Appl. No. 11/666,081.

(Continued)

*Primary Examiner* — Albert Cutler
(74) *Attorney, Agent, or Firm* — Oliff & Berridge, PLC

(57) ABSTRACT

The digital camera includes: a storage unit that stores a plurality of images captured by an image sensor when a multiple exposure photographic mode is set; a gain impartation unit that imparts, to the plurality of captured images, gains based upon the number of shots of multiple exposure photography and determined so that their sum equals unity; and a combination unit that creates a multiple exposure photographic image by combining the plurality of images, after the gains have been imparted by the gain impartation unit.

9 Claims, 11 Drawing Sheets

(56) References Cited

FOREIGN PATENT DOCUMENTS

| JP | A-2002-112008 | 4/2002 |
| JP | A-2002-112103 | 4/2002 |
| JP | A 2003-69888 | 3/2003 |
| JP | A 2003-298925 | 10/2003 |
| WO | WO 02/37830 A2 | 5/2002 |
| WO | WO 2004/063878 A2 | 7/2004 |

OTHER PUBLICATIONS

Office Action dated Jun. 1, 2011 issued in U.S. Appl. No. 11/666,081.
Office Action dated Dec. 21, 2011 issued in U.S. Appl. No. 11/666,081.
European Search Report dated Apr. 15, 2011 issued in European Patent Application No. 05795739.1.

* cited by examiner

FIG.5

| MULTIPLE EXPOSURE SETTINGS | |
|---|---|
| NUMBER OF SHOTS 2 | —2a |
| AUTOMATIC GAIN YES<br>CORRECTION NO | —2b |
| ORIGINAL IMAGES KEEP<br>DO NOT<br>KEEP | —2c |

FIG.6

| IMAGE 1 |
|---|
| IMAGE 2 |
| IMAGE 3 |
| IMAGE 4 |
| IMAGE 5 |
| (IMAGE 1+2+3+4+5)/5 |
| |
| |
| |
| |

DIGITAL CAMERA AND IMAGE COMBINATION DEVICE

This is a Continuation of application Ser. No. 11/666,081 filed Jul. 9, 2008, which is a national phase of PCT/JP2005/019284 filed Oct. 20, 2005, which claims priority to JP2004-310301 filed Oct. 26, 2004 in Japan, JP2005-000779 filed Jan. 5, 2005 in Japan and JP2005-172215 filed Jun. 13, 2005 in Japan. The disclosure of the prior application is hereby incorporated by reference herein in its entirety.

TECHNICAL FIELD

The present invention relates to a digital camera that combines images that have been photographed by multiple exposure, and to an image combination device that combines a plurality of photographic images.

BACKGROUND OF THE INVENTION

A digital camera of the following type is known from Patent Reference #1. When creating a single image by superimposing a plurality of images that have been captured by multiple exposure, addition averaging processing is performed by, after having added together the image data for each shot, dividing the result by the number of shots.

Furthermore, with the digital camera of Patent Reference #1, a multiple exposure photographic image is created by superimposing a plurality of images, this multiple exposure photographic image is stored, and unnecessary original images are deleted.

Yet further, a technique of obtaining a multiple photography image in which a plurality of photographic images are superimposed is known from Patent Reference #2.

Patent Reference #1: Japanese Laid-Open Patent Publication 2003-69888.

Patent Reference #2: Japanese Laid-Open Patent Publication 2003-298925.

DISCLOSURE OF THE INVENTION

Problems to be Solved by the Invention

With the digital camera of Patent Reference #1, when creating a single image by superimposing a plurality of images that have been captured by multiple exposure, addition averaging processing is performed by, after having added together the image data for each shot, dividing the result by the number of shots; but when the number of images that are to be superimposed increases, there has been a possibility that the data overflows before division. Moreover, since the plurality of image data that have been captured by multiple exposure are added together just as they are, the problem has arisen that there is a possibility of over exposure occurring.

Furthermore, with the digital camera of Patent Reference #1, it is not possible to refer to the original images, since only the multiple exposure photographic image is stored.

In Patent Reference #2 it is disclosed, when obtaining a multiple photography image, to replace the background portions of images for which photography has been completed into a through image that is displayed upon a monitor. It is not possible to verify the beneficial effect of superimposition for the entire area of the image from the image displayed upon the monitor in which the background of the image is replaced.

Means for Solving the Problems

According to the 1st aspect of the present invention, a digital camera comprises: a storage unit that stores a plurality of images captured by an image sensor when a multiple exposure photographic mode is set; a gain impartation unit that imparts, to the plurality of captured images, gains based upon a number of shots of multiple exposure photography and determined so that a sum of the gains equals unity; and a combination unit that creates a multiple exposure photographic image by combining the plurality of images, after the gains have been imparted by the gain impartation unit.

According to the 2nd aspect of the present invention, in the digital camera according to the 1st aspect, it is preferred that the combination unit, when the captured images are being stored in the storage unit after the gains have been imparted, reads out and combines the plurality of images from the storage unit, and, when the captured images are being stored in the storage unit without the gains having been imparted, imparts the gains to the plurality of images that have been read out from the storage unit, and then combines the plurality of images.

According to the 3rd aspect of the present invention, in the digital camera according to the 1st or the 2nd aspect, it is preferred that: there is further provided an interrupt command unit that interrupts image capture before image capture of the number of shots for multiple exposure photography is completed; when image capture has been interrupted by the interrupt command unit before image capture of the number of shots for multiple exposure photography is completed, the gain impartation unit imparts, to the plurality of captured images, the gains based upon a number of shots that have been captured up to a point of interruption, and determined so that a sum of the gains equals unity; and the combination unit combines the plurality of images that have been captured up to the point of interruption, to create a multiple exposure photographic image.

According to the 4th aspect of the present invention, in the digital camera according to any one of the 1st through 3rd aspects, it is preferred that: there is further provided a changeover unit that changes over between effectiveness or ineffectiveness of gain impartation by the gain impartation unit; and when gain impartation is made effective by the changeover unit, the gain impartation unit imparts the gains to the plurality of images that have been captured.

According to the 5th aspect of the present invention, in the digital camera according to any one of the 1st through 4th aspects, it is preferred that there is further provided an image processing unit that executes various types of image processing upon the multiple exposure photographic image created by the combination unit.

According to the 6th aspect of the present invention, a digital camera comprises: a storage unit that stores a plurality of images captured by an image sensor when a multiple exposure photographic mode is set; a combination unit that creates a multiple exposure photographic image by combining the plurality of images stored in the storage unit; and a recording control unit that, when performing processing to record a multiple exposure photographic image that has been combined by the combination unit upon a recording medium, also records original images before combination that are stored in the storage unit upon the recording medium along with the multiple exposure photographic image.

According to the 7th aspect of the present invention, in the digital camera according to the 6th aspect, it is preferred that there is further provided a recording selection unit that, when performing processing to record a multiple exposure photographic image upon the recording medium, selects a first recording mode in which only the multiple exposure photographic image is recorded or a second recording mode in which the multiple exposure photographic image and original images are recorded.

According to the 8th aspect of the present invention, in the digital camera according to the 7th aspect, it is preferred that: there is further provided a gain impartation unit that imparts, to the plurality of captured images, gains based upon a number of shots of multiple exposure photography and determined so that a sum of the gains equals unity; and the combination unit creates the multiple exposure photographic image by combining the plurality of images, after the gains have been imparted by the gain impartation unit.

According to the 9th aspect of the present invention, in the digital camera according to the 8th aspect, it is preferred that there is further provided a combination selection unit that, for combination of images by the combination unit, selects a first combination mode in which, after impartation of the gains by the gain impartation unit, the plurality of images are combined and a multiple exposure photographic image is created, or a second combination mode in which, without the gains being imparted by the gain impartation unit, the plurality of images are combined and a multiple exposure photographic image is created.

According to the 10th aspect of the present invention, in the digital camera according to the 9th aspect, it is preferred that, when the second recording mode has been selected by the recording selection unit: the combination unit creates the multiple exposure photographic image by combining the plurality of images after the gains have been imparted to the original images by the gain impartation unit, even though the second combination mode is selected by the combination selection unit; and the recording control unit records the original images to which no gains have been imparted upon the recording medium, along with the multiple exposure photographic image.

According to the 11th aspect of the present invention, in the digital camera according to the 6th aspect, it is preferred that: there is further provided a gain impartation unit that imparts, to the plurality of captured images, gains based upon a number of shots of multiple exposure photography and determined so that a sum of the gains equals unity; and the combination unit creates the multiple exposure photographic image by combining the plurality of images after the gains have been imparted thereto by the gain impartation unit.

According to the 12th aspect of the present invention, in the digital camera according to the 11th aspect, it is preferred that there is further provided a combination selection unit that, for combination of images by the combination unit, selects a first combination mode in which, after impartation of the gains by the gain impartation unit, the plurality of images are combined and a multiple exposure photographic image is created, or a second combination mode in which, without the gains being imparted by the gain impartation unit, the plurality of images are combined and a multiple exposure photographic image is created.

According to the 13th aspect of the present invention, an image combination device comprises: an image combination unit that obtains an image in which a first image and a second image are superimposed; an auxiliary image combination unit that, before the image combination unit starts superimposition of images, superimposes a first auxiliary image that is created based upon data of the first image and in which an amount of data is less than that of the first image, and a second auxiliary image that is created based upon data of the second image and in which an amount of data is less than that of the second image, to obtain an auxiliary image that corresponds to the image obtained by the image combination unit after superimposition; and a display unit that displays the auxiliary image after superimposition by the auxiliary image combination unit.

According to the 14th aspect of the present invention, in the image combination device according to the 13st aspect, it is preferred that the display unit displays the first auxiliary image, the second auxiliary image, and the auxiliary image after superimposition within the same screen.

According to the 15th aspect of the present invention, in the image combination device according to the 13th or 14th aspect, it is preferred that: the first auxiliary image is a thumbnail image that is comprised within a data file in which the first image is recorded; and the second auxiliary image is a thumbnail image that is comprised within a data file in which the second image is recorded.

According to the 16th aspect of the present invention, in the image combination device according to any one of the 13th through 15th aspects, it is preferred that: there is further provided a superimposition ratio setting unit that sets a superimposition ratio when the image combination unit is superimposing images; and the auxiliary image combination unit superimposes the first auxiliary image and the second auxiliary image using the superimposition ratio set by the superimposition ratio setting unit.

According to the 17th aspect of the present invention, in the image combination device according to any one of the 13th through 16th aspects, it is preferred that the image combination unit starts superimposition of images, in correspondence to a start command after the auxiliary image combination unit has obtained the auxiliary image after superimposition.

According to the 18th aspect of the present invention, in the image combination device according to the 17th aspect, it is preferred that the image combination unit starts recording of the image after superimposition, in correspondence to a start command after the image combination unit has obtained the image after superimposition.

According to the 19th aspect of the present invention, in the image combination device according to the 18th aspect, it is preferred that a recording format of the image after superimposition is an image recording format that is set in a digital camera.

According to the 20th aspect of the present invention, in the image combination device according to any one of the 13th through 19th aspects, it is preferred that the images that are superimposed by the image combination unit are recorded as RAW data.

According to the 21st aspect of the present invention, a digital camera, comprises an image combination device according to any one of the 13th through 20th aspects.

The above described storage unit may be replaced by a storage means.

The above described gain impartation unit may be replaced by a gain impartation means.

The above described combination unit may be replaced by a combination means.

The above described interrupt command unit may be replaced by an interrupt command means.

The above described changeover unit may be replaced by a changeover means.

The above described image processing unit may be replaced by an image processing means.

The above described recording control unit may be replaced by a recording control means.

The above described recording selection unit may be replaced by a recording selection means.

The above described combination selection unit may be replaced by a combination selection means.

The above described image combination unit may be replaced by an image combination means.

The above described auxiliary image combination unit may be replaced by an auxiliary image combination means.

The above described display unit may be replaced by a display means.

The above described superimposition ratio setting unit may be replaced by a superimposition ratio setting means.

Advantageous Effect of the Invention

According to the present invention, it is arranged to create the multiple exposure photographic image by combining the plurality of captured images, after gains based upon the number of shots of multiple exposure photography and determined so that their sum equals unity have been imparted to this plurality of images. Due to this, it is possible to avoid the data overflowing partway through the combination process. Moreover, it is possible to prevent over-exposure occurring during combination, and it is possible to obtain a multiple exposure photographic image with an appropriate exposure.

Furthermore, according to another aspect of the invention, it is possible to refer to the original images, since it is arranged to store the original images along with the multiple exposure photographic image.

Furthermore, according to another aspect of the invention, it is possible immediately to verify the beneficial effect of superimposition over the entire area of the images, since it is arranged, before the image combination means starts its superimposition of a first image and a second image, to superimpose a first auxiliary image in which the amount of data is smaller, and a second auxiliary image in which the amount of data is smaller, and to display the auxiliary image after this superimposition.

BRIEF DESCRIPTION OF THE DRAWINGS

FIG. 5 is a figure showing a concrete example of a multiple exposure setting screen in a second embodiment;

FIG. 6 is a figure showing a concrete example of RAW data that is stored in an image memory, in this second embodiment;

BEST MODE FOR CARRYING OUT THE INVENTION

In the following, preferred embodiments for implementing the present invention will be explained.

Embodiment One

Figure 1:
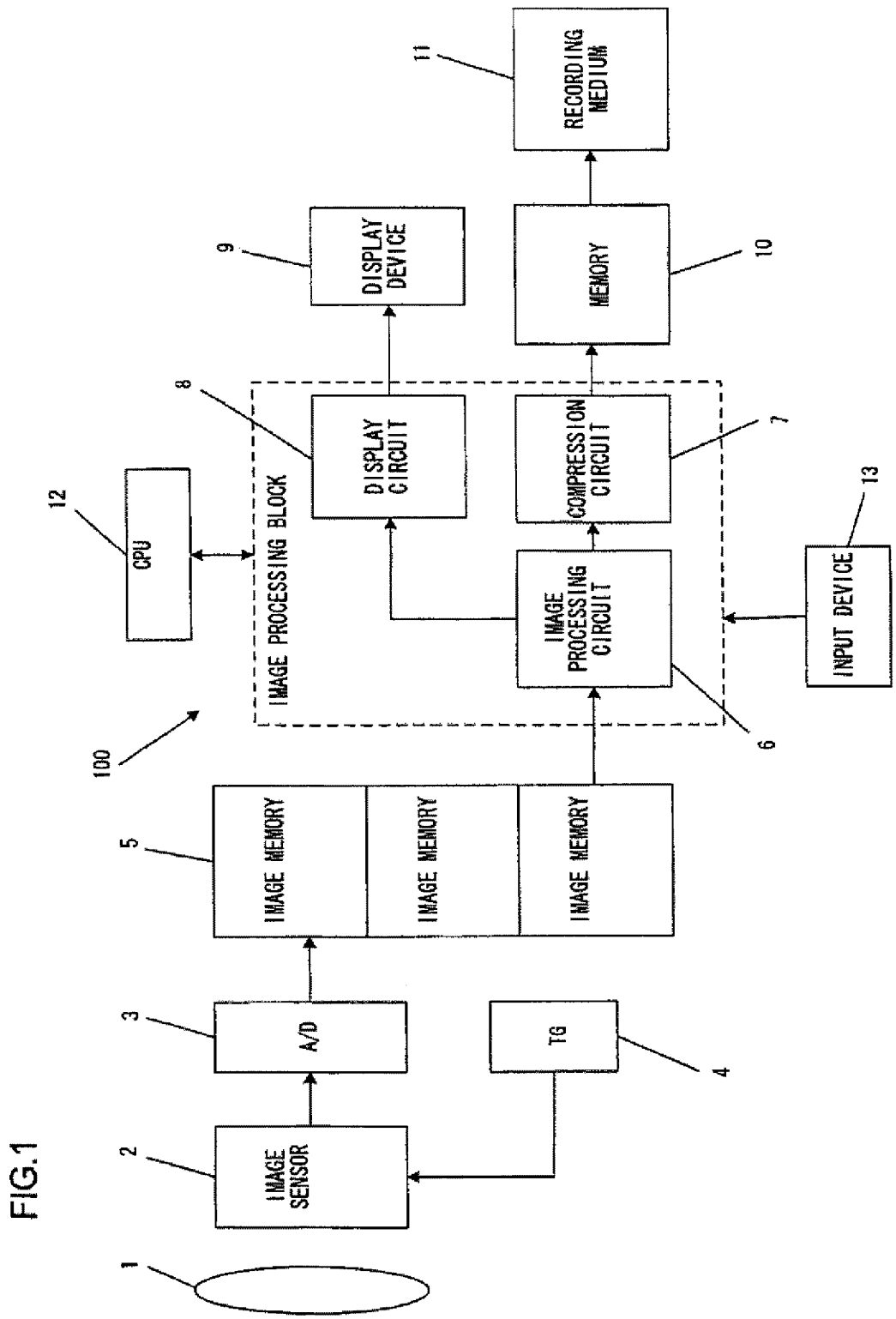
FIG. 1 is a block diagram showing the structure of an embodiment of a digital camera.

FIG. 1 is a block diagram showing the structure of an embodiment of a digital camera that is a first embodiment of the present invention. This digital camera 100 includes: a photographic lens 1; an image sensor 2 such as a CCD or a like; an A/D conversion circuit 3 that converts the analog signal outputted from the image sensor 2 into a digital signal; a timing generator (TG) that supplies a timing signal to the image sensor 2; an image memory (semiconductor memory) 5 that temporarily stores a plurality of images that have been captured; an image processing circuit 6 that performs various types of image processing as will be described hereinafter; a compression circuit 7 that converts the image data that has been processed by the image processing circuit 6 to an image format such as JPEG or the like; a display circuit 8 that performs display processing for displaying images that have been captured upon a display device such as a TFT or the like; a memory 10 that temporarily stores the image data that has been compressed by the compression circuit 7; a removable recording medium 11 such as a memory card or the like for copying and storing image data that has been stored in the memory 10; a CPU 12 that controls the digital camera 102 [sic]; and an input device 13 including a release button that is actuated by the user and various types of setting button and the like.

It should be understood that, apart from the above described image display function, a menu is displayed upon the display device 9 for changing various types of setting value of the digital camera 100; and, by actuating the input device 13 according to this menu that has been displayed, the user is able to change the settings of the digital camera 100.

With this digital camera 100, when the release button is depressed by the user, photography is performed at an aperture and a shutter speed that are set according to the luminance of the photographic subject, and electric charges corresponding to an image of the photographic subject are accumulated upon the image sensor 2. These electric charges accumulated by the image sensor 2 are converted into a digital signal by the A/D conversion circuit 3, and the image data generated before various types of image processing are performed thereupon, in other words the RAW data, is stored in the image memory 5. It should be understood that the image memory 5 is a buffer memory, and is capable of storing the RAW data for a plurality of images.

Having read in the RAW data stored in the image memory 5, the image processing circuit 6 performs known image processing such as interpolation, color temperature correction, and tone correction and the like thereupon, and also performs automatic gain correction that will be described hereinafter, and combination of the images. Thereafter compression conversion is performed by the compression circuit 7 upon the image data according to a predetermined compression format, for example the JPEG format, and then the data is stored in the memory 10. The image data that has been stored in the memory 10 is copied and stored upon the recording medium 11 automatically, or according to a command from the user. Furthermore, the image data that has been image processed by the image processing circuit 6 is subjected to display processing by the display circuit 8, and is then displayed upon the display device 9.

Figure 2:
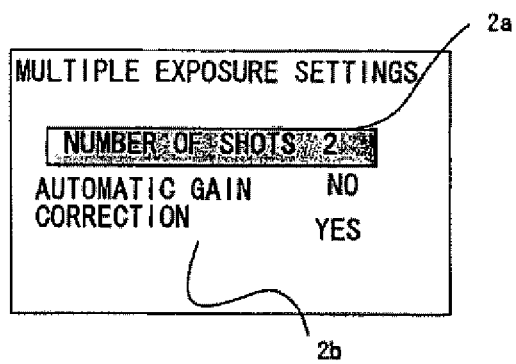
FIG. 2 is a figure showing a concrete example of a multiple exposure setting screen in this first embodiment.

The digital camera 100 according to this first embodiment is capable of image capture by multiple exposure, and, when the multiple exposure photographic mode is set, images consisting of a number of shots (a number of frames) set in advance by the user are captured according to this multiple exposure photographic mode. When the multiple exposure photographic mode is commanded by the user, the multiple exposure setting screen shown in FIG. 2 is displayed upon the display device 9. On this multiple exposure setting screen, first the number of shots to be captured by multiple exposure is set by being inputted in a number of shots input field 2a. It is arranged for it to be possible to set this number of shots as desired within a predetermined range, for example from two shots to ten shots. Furthermore, at the same time the user sets whether or not automatic gain correction is to be performed, as will be described hereinafter. Whether or not automatic gain correction is to be performed is set by selecting one of "no" (not performed) and "yes" (performed) for automatic gain correction in an automatic gain correction setting field 2b. It should be understood that, if the number of shots is not set in the number of shots input field 2a, then it is supposed that image capture by multiple exposure is not to be performed.

Figure 3:
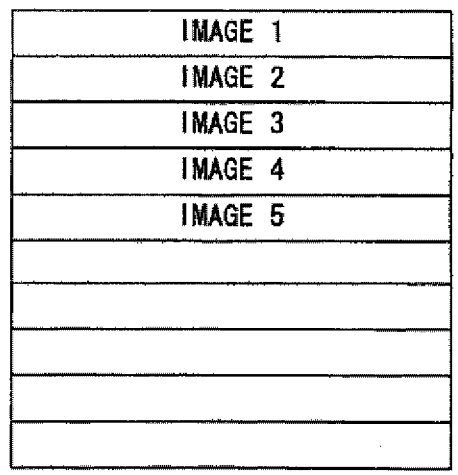
FIG. 3 is a figure showing a concrete example of RAW data that is stored in an image memory, in this first embodiment.

In the multiple exposure photographic mode in which the number of shots for multiple exposure photography has been set by the user, images of shots are captured at an exposure value that has been set while depressing the release switch, until photography of the number of shots that has been set has been performed. And the image data for each shot, in other words the RAW data, is stored in the image memory 5. For example, if the number of shots is set to five, then as shown in FIG. 3, the RAW data for the images 1 through 5 of five shots is stored in the image memory 5.

The image processing circuit 6 combines all of the RAW data that is stored in the image memory 5 by addition. At this time, if automatic gain correction has been set to "no" on the multiple exposure setting screen shown in FIG. 2, then all of the RAW data that is stored in the image memory 5 is combined in order by addition. In other words, since each set of RAW data that has been stored in the memory 5 is digital data that has been obtained by converting the electric charges outputted from the various pixels (picture elements) of the image sensor 2 into digital form, accordingly it is possible to combine them by adding together the pixel data items for the same position in the image. Thus, after for example having added image #1 to image #2 (image #1+image #2), image #3 is further added to the result of this addition, and it is possible to combine all the images by thus adding them in order.

However, when the RAW data that is stored in the memory 5 in this manner is combined just as it is, there is a fear that over-exposure may occur, which is undesirable. Thus, in order to avoid this, it is necessary to set the exposure value to an under-exposure level corresponding to the number of shots that are to be performed during multiple exposure: for example, if a multiple exposure of five shots is to be performed, then it is necessary to calculate and set the appropriate exposure value according to the following Equation (1):

$$\text{Appropriate exposure value} = \text{Log}(\frac{1}{5})/\text{Log}(2) = 2.3 \quad (1)$$

Due to this it is understood that, when a multiple exposure of five shots is to be performed, then it will be suitable to perform image capture after having set the exposure in advance to 2.3 stops under.

However, when performing photography by multiple exposure in this manner, the task of calculating the appropriate exposure each time according to the number of shots of multiple exposure that are to be taken becomes troublesome, and this is not desirable. Thus, in the first embodiment, if automatic gain correction is set to "yes" on the multiple exposure setting screen shown in FIG. 2, the frames of RAW data that are stored in the image memory 5 are combined by adding together the pixel data for the same positions in the images after having reduced the gain thereof digitally in advance. For example, in the case of performing a multiple exposure of five shots, the five frames of RAW data that are stored in the image memory 5 are added together after having performed automatic gain setting according to the following Equation (2) in advance, in other words after having reduced the gain:

$$K1 \times (\text{image \#1}) + K2 \times (\text{image \#2}) + K3 \times (\text{image \#3}) + K4 \times (\text{image \#4}) + K5 \times (\text{image \#5}) \quad (2)$$

The variables K1 through K5 in Equation (2) denote the digital gains for each of the images, and they are set so that their sum is unity. For example by dividing 1 into proportions according to the number of shots, like K1=K2=K3=K4=K5=0.2, and by multiplying each image by the result, it is possible to reduce all of the images by the same digital gain. Furthermore, by setting K1>K2>K3>K4>K5, the images become darker the later the RAW data has been captured, so that it becomes possible to display them so that the image fades out; while, by setting K1<K2<K3<K4<K5, the images become brighter the later the RAW data has been captured, so that it becomes possible to display them so that the image fades in.

By combining the frames of RAW data that have been captured by multiple exposure by adding them together after having reduced their gains by multiplying them by gains of which the sum is unity, it is possible to prevent over exposure during the combination, and it is possible to obtain a multiple exposure photographic image having an appropriate exposure. Furthermore if, in the method of combining the RAW data stored in the image memory 5 described above just as it is, the number of shots captured by multiple exposure that has been set in advance is large, then there is a possibility that the data overflows partway through adding together the RAW data; but, according to the present invention, it also becomes possible to avoid this problem, since the addition is performed after having reduced the gains in advance.

Moreover, in this first embodiment, processing as described hereinafter is performed so as to make it possible to obtain a multiple exposure photographic image with an adequate exposure, even if the multiple exposure has been interrupted partway through. It should be understood that this case of the multiple exposure being interrupted partway through is considered to be, for example, any one of the following cases: (A) when interruption of the multiple exposure has been commanded by the user, according to actuation of the input device 13; (B) when a function is provided for turning the power supply OFF automatically when the digital camera 100 has not been actuated during a predetermined time period that is determined in advance, and actuation has not been performed during this predetermined time period so that the power supply has thus been turned OFF automatically; and (C) when the power supply for the digital camera 100 has been turned OFF due to actuation of the input device 13 by the user; and these are controlled by the CPU 12.

If, due to any one of (A) through (C) described above, the image processing circuit 6 has decided that the multiple exposure has been interrupted partway through, then combination is performed according to Equation (2) based upon the number of shots of RAW data that were captured at the time of interruption. For example if the number of shots to be captured by multiple exposure is set to eight, so that the combination is to be performed, if no interruption occurs, by performing automatic gain stetting based upon Equation (2) by setting the digital gains so that the total of K1 through K8 for the eight shots of RAW data that have been captured becomes unity, then, if the multiple exposure has been interrupted at the time point that images for five shots have been captured, combination of the RAW data for the five shots that have been captured is performed by performing automatic gain setting based upon Equation (2), by setting the digital gains so that the total of K1 through K5 becomes unity. By doing this, it is possible to obtain a multiple exposure photographic image with an adequate exposure, even if the multiple exposure is interrupted partway through.

Figure 4:
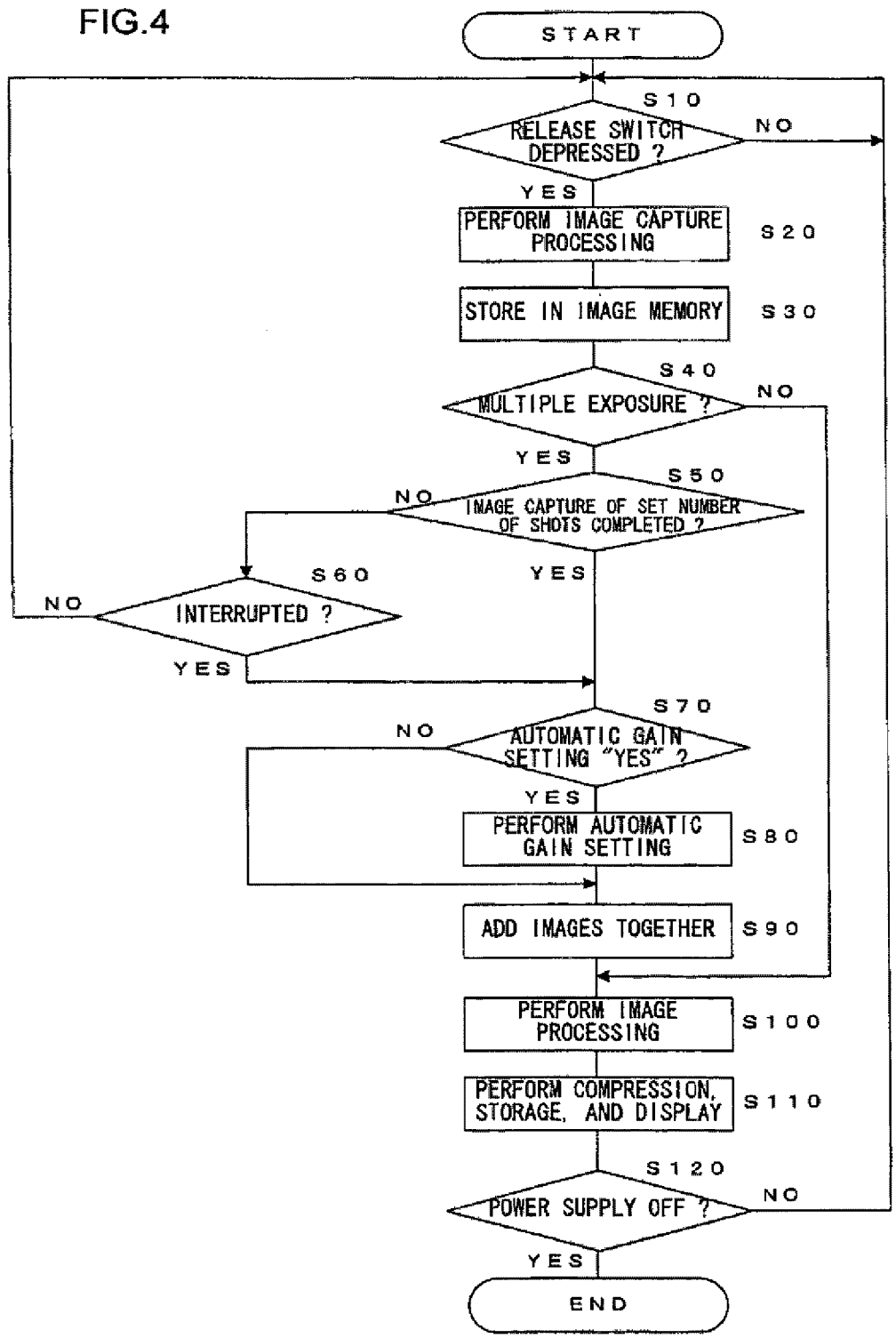
FIG. 4 is a flow chart showing the flow of processing in this digital camera.

FIG. 4 is a flow chart showing the flow of processing in this digital camera 100 of the first embodiment. This processing shown in FIG. 4 is executed by the CPU 12 as a program that is started when the power supply of this digital camera is turned ON. In a step S10, a decision is made as to whether or not the release button has been depressed by the user. If it is decided that the release button has been depressed by the user, the flow of control proceeds to a step S20. In this step S20, capture of an image of the photographic subject by the image sensor 2 via the photographic lens 1 is performed. At this time, if the exposure condition is the automatic exposure photographic mode, then an appropriate exposure value is set according to the luminance of the photographic subject. Then the flow of control proceeds to a step S30. In this step S30, the electric charge accumulated by the image sensor 2 is converted into a digital signal by the A/D conversion circuit 3 into RAW data, that is stored in the image memory 5.

After this the flow of control proceeds to a step S40, in which it is decided whether the multiple exposure photographic mode is being commanded by the user upon the multiple exposure setting screen shown in FIG. 2, in other words whether a number of shots for image capture by multiple exposure is set. If image capture by multiple exposure is not being commanded, then the flow of control is transferred to a step S100 that will be described hereinafter. On the other hand, if the multiple exposure mode is being commanded, then the flow of control proceeds to a step S50. In this step S50, a decision is made as to whether or not image capture has been completed of the number of shots for image capture by multiple exposure that has been set by the user in advance. If it is decided that image capture of this number of shots for image capture by multiple exposure has been completed, then the flow of control proceeds to a step S70.

On the other hand, if it is decided that image capture of this number of shots for image capture by multiple exposure has not been completed, then the flow of control proceeds to a step S60. In this step S60, it is decided whether or not, for any one of the reasons (A) through (C) described above, the multiple exposure has been interrupted partway through. If it is decided that the multiple exposure has not been interrupted, then the flow of control returns to the step S10 and depression of the release switch is awaited. And, when the release switch is depressed, the processing described above is repeated. On the other hand, if it is decided that the multiple exposure has been interrupted, then the flow of control proceeds to the step S70.

In the step S70, a decision is made as to whether or not automatic gain correction is set by the user to "yes" upon the multiple exposure setting screen shown in FIG. 2. If it is decided that the automatic gain correction is being set to "no", then the flow of control is transferred to a step S90. On the other hand, if it is decided that the automatic gain correction is set to "yes", then the flow of control proceeds to a step S80, and after, based upon Equation (2) described above, the image processing circuit 6 has reduced the gains of the RAW data for the images stored in the image memory 5, then the flow of control proceeds to the step S90. It should be understood that since, as described above, the gains K are set based upon the number of shots, accordingly, in the case of interruption, instead of using the gains that have been determined in advance and that are determined according to the number of shots, gains are used that are determined based upon the number of shots that have actually been photographed.

In the step S90 the image processing circuit combines the RAW data that are stored in the image memory 5, or the RAW data after reduction of gain in the step S80, by adding them together, and then the flow of control proceeds to a step S100. In this step S100, known image processing such as interpolation, color temperature correction, tone correction, and the like is performed, and then the flow of control proceeds to a step S110. In this step S110, the image obtained by combination by the image processing circuit 6 is subjected to compression conversion in a predetermined compression format by the compression circuit 7, and is stored in the memory 10. And the image data that has been stored in the memory 10 is copied to the recording medium 11 and is stored, either automatically or according to a command from the user. Furthermore, the image that has been obtained by combination by the image processing circuit 6 is displayed upon the display device 9 by the display circuit 8.

Thereafter the flow of control proceeds to the step S120, and a decision is made as to whether or not the power supply to the digital camera 100 has been turned OFF. If it is decided that the power supply has not been turned OFF, then the flow of control returns to the step S10 and the processing is repeated. On the other hand, if it is decided that the power supply has been turned OFF, then this processing is terminated.

According to the first embodiment as explained above, the following beneficial operational effects may be obtained.

(1) When the automatic gain correction has been set to "yes" by the user, it is arranged to combine the RAW data for the images stored in the image memory 5 by adding together the pixel data for the same positions in the image, after having reduced the gains thereof digitally in advance. Due to this, it is possible to prevent over-exposure occurring during the combination, and it is possible to obtain a multiple exposure photographic image with an adequate exposure. Furthermore, it is possible to avoid overflow of the data partway through the addition of the RAW data.

(2) It was arranged to reduce the gains of the RAW data for the images that have been captured by multiple exposure by multiplication by digital gains of which the sum equals unity. Due to this, for example, it is possible to reduce the gains according to digital gains that have been calculated by proportional division of the sum of unity by the number of shots of which images have been captured by multiple exposure; and, provided that each of the shots is captured with an exposure value that is adequate, then it is possible to obtain a multiple exposure photographic image with an appropriate exposure according to the number of shots captured by multiple exposure.

(3) It was arranged, if it has been decided that the multiple exposure has been interrupted partway through, to calculate the digital gains according to the number of shots for which images have been captured up till the moment of interruption, and to combine the image data by multiplication of the RAW data for the plurality of shots of which images have been captured by these digital gains. Due to this, it is possible to obtain a multiple exposure photographic image with an adequate exposure, even if the multiple exposure has been interrupted partway through.

(4) It is arranged for the user to be able to set the automatic gain setting in advance to "yes" or "no". Due to this, it becomes possible to perform image capture of an appropriate multiple exposure photographic image in which the image capture conditions for the photographic subject are taken into account.

Variant Embodiment #1

The following variations may also be employed.

(1) In the embodiment described above a case was explained, by way of example, in which, if the automatic gain setting is set to "yes", then, after the RAW data is temporarily stored in the image memory 5, the image processing circuit 6 reads in this RAW data that has been stored in the image memory 5, and combines them while performing automatic gain setting. However, the present invention is not limited by this feature; it would also be acceptable to arrange to store the RAW data in the image memory 5, after the automatic gain setting has been performed. It should be understood that, if the multiple exposure has been interrupted partway through, then, after this interruption, it is necessary to perform the automatic gain setting for a second time, based upon the number of shots that have actually been photographed.

(2) In the embodiment described above, an example has been explained in which, after the RAW data has been combined, image processing such as interpolation, color temperature correction, tone correction, and the like is performed upon the image data after combination. However, the present invention is not limited by this feature; it would also be acceptable to perform the combination after having performed various types of image processing if, as a result of performing such image processing upon the RAW data, data is obtained that can be combined by adding together the pixel data in the same position upon the images.

(3) Although, in the embodiment described above, an example was explained in which the image processing circuit 6, the compression circuit 7, and the display circuit 8 are mounted to the digital camera 8, the present invention is not limited by this feature; it would also be acceptable to arrange to provide the functions that were implemented by the image processing circuit 6, the compression circuit 7, and the display circuit 8 by an external device, for example a personal computer or the like. In this case, the RAW data that has been captured by the image sensor 2 would be subjected to various types of processing after having been copied to the personal computer via a memory card or an interface cable.

Embodiment Two

In a second embodiment a structure is employed in which it is possible, in addition to the multiple exposure photographic image that has been obtained by combination, also to store the original images that were used in this combination for the multiple exposure photographic image upon the recording medium.

With the digital camera according to this second embodiment, when the multiple exposure photographic mode is commanded, the multiple exposure setting screen shown in FIG. 5 is displayed upon the display device 9. The following three items may be set upon this multiple exposure setting screen:

(a) In the same manner as in the case of the first embodiment, the number of shots for image capture by multiple exposure is set by being inputted in a number of shots input field 2a. It is arranged for it to be possible to set this number of shots as desired within a predetermined range, for example between two shots and ten shots.

(b) In the same manner as in the case of the first embodiment, whether or not to perform automatic gain correction is set. Whether or not to perform automatic gain correction is set by selecting one or the other of "no" (ineffective) and "yes" (effective) for automatic gain correction in an automatic gain correction field 2b. It should be understood that, if no number of shots is set in the number of shots input field 2a, then it is presumed that image capture by multiple exposure is not to be performed.

(c) Whether or not to perform storage of the original images that have been used for combination for the multiple exposure photographic image is set. It is arranged to perform this setting by selection of either "keep" or "do not keep" for the original images in an original images storage/non-storage field 2c.

In this second embodiment, if "do not keep" is selected for the original images, then, when the multiple exposure photography is completed and this multiple exposure photographic image is recorded upon the recording medium 11, only the multiple exposure photographic image is stored upon the recording medium 11. On the other hand, if "keep" is selected for the original images, then, when the multiple exposure photography is completed and this multiple exposure photographic image is recorded upon the recording medium 11, along with the multiple exposure photographic image, also the original images are stored upon the recording medium 11.

It should be understood that the case in which "yes" (effective) is set for the automatic gain correction is termed the first combination mode, while the case in which "no" (ineffective) is set for the automatic gain correction is termed the second combination mode. Furthermore, the case in which "do not keep" is selected for the original images is termed the first recording mode, while the case in which "keep" is selected for the original images is termed the second recording mode.

The flow of processing performed by the digital camera according to this second embodiment is also the same as that shown in the flow chart of FIG. 4. Apart from the step S110, the explanation of the other processing will be omitted, since it is the same as in the case of the first embodiment. In the step S110 of FIG. 4, the CPU 12 performs compression upon the above described combined image (the multiple exposure photographic image), stores the combined image after compression conversion upon the recording medium 11, and displays the combined image upon the display device 9. If "keep" is set for the original images, then, when storing the combined image upon the recording medium 11, the CPU 12 further also stores the original images together therewith. It would be acceptable for these original images that are recorded upon the recording medium 11 to be the images whose gains have been reduced; or it would also be acceptable for them to be the RAW data before reduction of gain was performed. Moreover, it would be acceptable to store a plurality of original images without setting any relationship between them and the combined image; or it would be acceptable to store the combined image and the plurality of original images in a manner such that it is possible to recognize that they are a single group of images.

According to the second embodiment that has been explained above, the following beneficial operational effects may be obtained.

(1) If "keep" for the original images has been set by the user, then, as shown by way of example in FIG. 6, it is arranged to record, upon the recording medium, both the RAW data for these images that has been stored in the image memory 5, and the combined image data that has been stored in the image memory 5 by combining them while reducing their gain digitally in advance. Due to this, it becomes possible to refer to the original images.

(2) It is arranged for it to be possible for the user to set either "keep" or "do not keep" for the digital images in advance. Due to this, according to requirements, the original images may not be recorded upon the recording medium along with the combined image, so that the recording capacity of the recording medium is not indiscriminately consumed.

Variant Embodiment #2

The following variation may also be employed.

(1) It would also be acceptable, if "keep" for the original images has been set, forcibly to set the automatic gain correction to "yes", and to store the original images without any gain reduction in the recording medium. By doing this, it is possible to refer to the combined image and to the original images in the same exposure state.

Embodiment Three

In a third embodiment, it is arranged to be able, before the electronic camera combines the main images, for the user to be able to check the state of exposure for the entire area of the image after combination.

Figure 7:
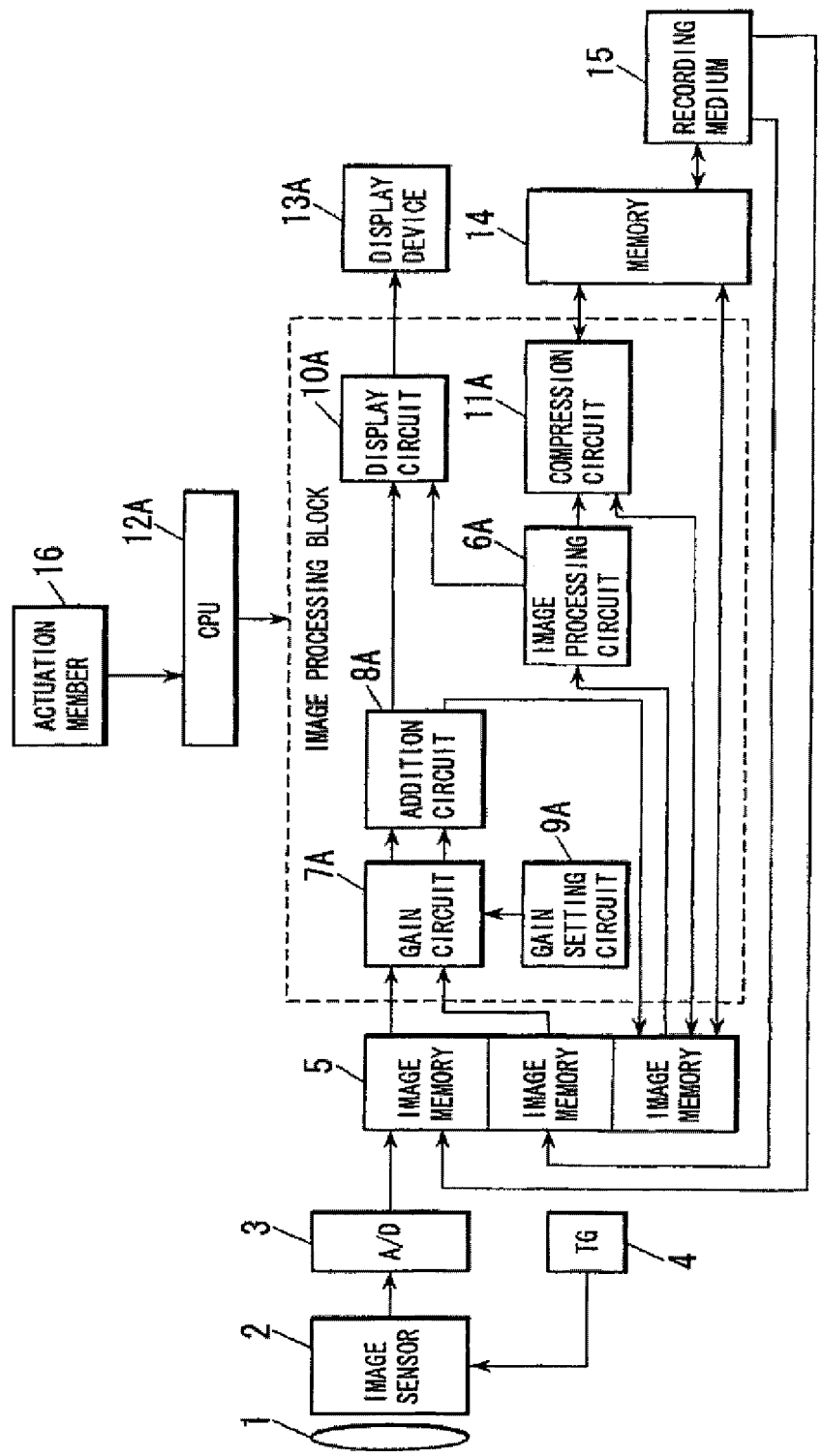
FIG. 7 is a figure showing the structure of an electronic camera according to a third embodiment.

FIG. 7 is a figure showing the structure of an electronic camera according to this third embodiment of the present invention. In FIG. 7, an image of the photographic subject is imaged upon the image capturing surface of an image sensor 2 by a photographic lens 1. The image sensor 2 captures this image of the photographic subject, and outputs the resulting image capture signal to an A/D conversion circuit 3. The A/D conversion circuit 3 converts this analog image signal that has been inputted from the image sensor 2 into a digital image signal, and outputs the digital data after this conversion to an image memory 5. A timing generator (TG) 4 supplies a timing signal to the image sensor 2.

The image memory 5 is a memory that temporarily stores the image data after digital conversion and image data after addition as will be described hereinafter. The memory capacity of this image memory 5 is such as to ensure that it is sufficient to be capable of storing the data for a plurality of photographic images. An image processing circuit 6A performs various types of image processing upon the image data that is stored in the image memory 5, such as interpolation processing, color temperature processing, tone correction processing, resolution conversion processing, and the like. And a gain circuit 7A applies a gain to the image data that is stored in the image memory 5 (i.e. multiplies the pixels thereof). The value for this gain is set to the gain circuit 7A by a gain setting circuit 9A.

An addition circuit 8A performs frame addition (i.e. addition for corresponding pixels) upon the image data for the plurality of frames that have been multiplied by the gain circuit 7A, and outputs the image data after this addition to the image memory 5. A compression circuit 11A performs compression processing upon the image data upon which image processing has been performed by the image processing circuit 6A, by a method such as JPEG or the like. And a display circuit 10A generates a display signal that is required for replay display of the photographic image upon a display device 13A.

The display device 13A may, for example, consist of a TFT liquid crystal panel, and it performs replay display of an image according to the display signal generated by the display circuit 10A. Apart from images, this display device 13A is adapted also to display an actuation menu. This actuation menu is used when performing various types of settings for the electronic camera. The display circuit 10A performs generation of a display signal that is required for displaying this actuation menu.

A memory 14 is a memory that temporarily stores the image data that has been subjected to compression processing by the compression circuit 11A. A recording medium 15 consists of a memory card that can be fitted to the electronic camera and removed therefrom. This electronic camera is made so as, in a photographic mode, to be capable of storing the image data that is stored in the memory 14 upon a recording medium 15, and, in a replay mode and in an image combination mode, to be capable of reading out the image data that is stored upon the recording medium 15 into the memory 14. The electronic camera is endowed with this photographic mode in which it performs photography of a photographic subject, with this replay mode in which it displays a photographic image upon the display device 13A, and with this image combination mode in which it combines photographic images.

A CPU 12A performs control of the various blocks that make up this electronic camera, as will be explained hereinafter. It should be understood that it is supposed that the gain circuit 7A, the gain setting circuit 9A, an addition circuit 8A, the image processing circuit 6A, the compression circuit 11A, and the display circuit 10A are particularly termed 'image processing blocks'. Actuation members 16 include a mode changeover switch that will be described hereinafter, a confirm key, and a pointing device such as a cruciform key or the like, and, according to various types of actuation, they generate actuation signals that are sent to the CPU 12A. The mode changeover switch is a switch for changing over between the photographic mode, the replay mode, the image combination mode, and the like.

[The Photographic Mode]

Upon depression actuation of a release button (not shown in the figures) of this electronic camera, that has been actuated with the mode changeover switch so as to be changed over to the photographic mode, along with an aperture (not shown in the figures) of the photographic lens 1 being driven to a predetermined aperture value, a shutter (also not shown in the figures) is driven to open. Due to this, an image of the photographic subject is focused upon the image capture surface of the image sensor 2. The electronic camera ends this exposure by driving the shutter (not shown in the figures) to close, so that an exposure time period corresponding to the exposure conditions is obtained.

The electric charges that have been accumulated during this exposure by the image sensor 2 are sequentially read out from the image sensor 2, and, after having been A/D converted, are stored as image data in the image memory 5. The image data at this time point is termed RAW data, and is the data before it has been subjected to image processing.

Predetermined image processing and compression processing are performed upon this RAW data, and the photographic image data after this compression processing are recorded upon the recording medium 15 via the memory 14. Furthermore, the photographic image is replay displayed upon the display device 13a according to a display signal that is generated using the image data after image processing. It should be understood that it is also made possible to record the photographic image data as the RAW data just as it is.

The electronic camera records the image data that has been photographed as image data files. In an image data file, there are included the photographic image (termed the main image), and a reduced image (a thumbnail image) of 160×120 pixels obtained by reducing the data size (i.e. the number of pixels) from the main image. This thumbnail image is created using the data for the main image. Here, the recording format of the main image data may be divided, for example, into the following four levels, according to the presence or absence of image processing, and according to differences in the compression ratio during the compression processing. This electronic camera changes over the recording format for the main image data, according to the data recording format that is selected during photography. The selection of the data recording format may be performed, for example, with the actuation menu described above.

(1) The image data is recorded without being subjected to image processing—"RAW".

(2) The image data after predetermined image processing is recorded in the non-compressed format RGE-TIFF—"TIFF".

(3) The image data after predetermined image processing is recorded at a compression ratio of ⅕—"FINE".

(4) The image data after predetermined image processing is recorded at a compression ratio of 1/10—"NORMAL".

Generally (1) described above provides a high picture quality, whereas (4) described above provides a low picture quality. The compression processing in (3) and (4) described above is performed in the JPEG format. It should be understood that the predetermined image processing is color temperature adjustment processing or the like. In this third embodiment, (1) is selected as the recording format for the main image data.

[The Image Combination Mode]

Figure 8:
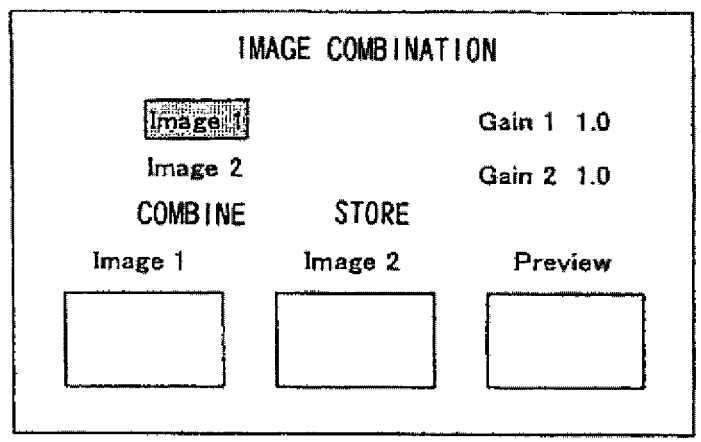
FIG. 8 is a figure showing an example of an initial screen that is displayed in an image combination mode.

This electronic camera, that has been actuated with the mode changeover switch so as to be changed over to the image combination mode, combines two images (termed the first image and the second image) that are recorded upon the recording medium 15 by superimposition. In this image combination processing, {1. image selection}, {2. gain setting}, {3. combination}, and {4. storage} are performed in order. FIG. 8 is a figure showing an example of an initial screen that is displayed upon the display device 13A in this image combination mode.

1. Image Selection

Figure 9:
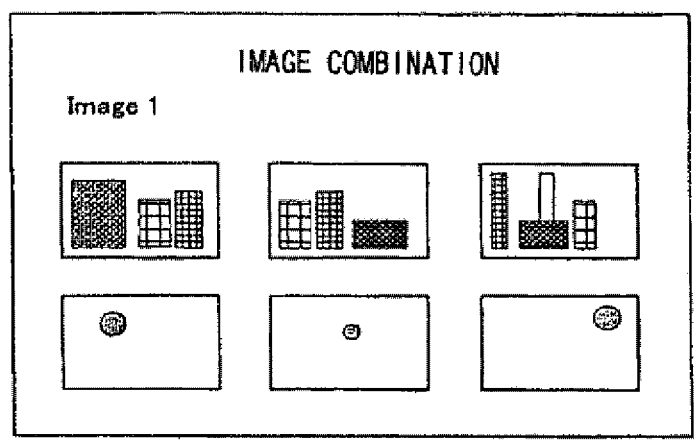
FIG. 9 is a figure showing an example of an image selection screen.

When, in the state in which the initial screen of FIG. 3 is being displayed upon the display device 13A, an actuation signal is inputted from the cruciform key that constitutes the actuation member 16 to select "Image #1" that corresponds to the first image, and furthermore an actuation signal is inputted from the confirm key so as to indicate confirmation of this selection, then the CPU 12A displays the image selection screen shown in FIG. 9 upon the display device 13A, instead of the initial screen. In FIG. 9, six thumbnail images that have been read out from six respective data files that are recorded upon the recording medium 15 are displayed, three in each of two rows. And, when an actuation signal is inputted from the cruciform key to select the image at the upper center (a night scene of buildings), and moreover an actuation signal is inputted from the confirm key that indicates that this selection has been confirmed, then, along with taking this image as the first image, the CPU 12A displays the image combination screen shown in FIG. 10 upon the display device 13A, instead of the image selection screen that is currently being displayed. It should be understood that, apart from the six thumbnail images that are currently being displayed upon this image selection screen, for other thumbnail images as well, it is arranged for it to be possible to read out and display the image data files that are newly recorded upon the recording medium 15 by actuation of the cruciform key.

Figure 10:
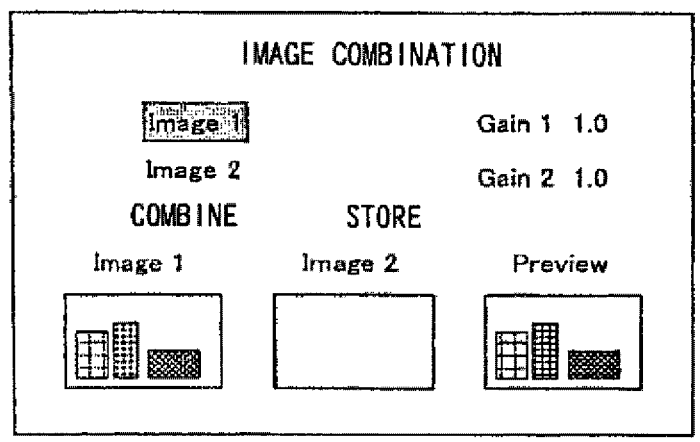
FIG. 10 is a figure showing an example of an image combination screen.

In FIG. 10: as "Image #1", a thumbnail image is displayed that corresponds to the first image; and, as "Preview", a thumbnail image is displayed that is the same as that for the first image. When an actuation signal is inputted from the cruciform key that constitutes the actuation member 16 to select "Image #2" that corresponds to the second image, and furthermore an actuation signal is inputted from the confirm key so as to indicate confirmation of this selection, then the CPU 12A displays an image selection screen like that of FIG. 9 for a second time upon the display device 13A, instead of the display screen of FIG. 10 that is currently being displayed. And, when an actuation signal is inputted from the cruciform key to select the image at the lower right (the Moon), and moreover an actuation signal is inputted from the confirm key that indicates that this selection has been confirmed, then, along with taking this image as the second image, the CPU 12A displays the image combination screen shown in FIG. 11 upon the display device 13A, instead of the image selection screen that is currently being displayed.

Figure 11:
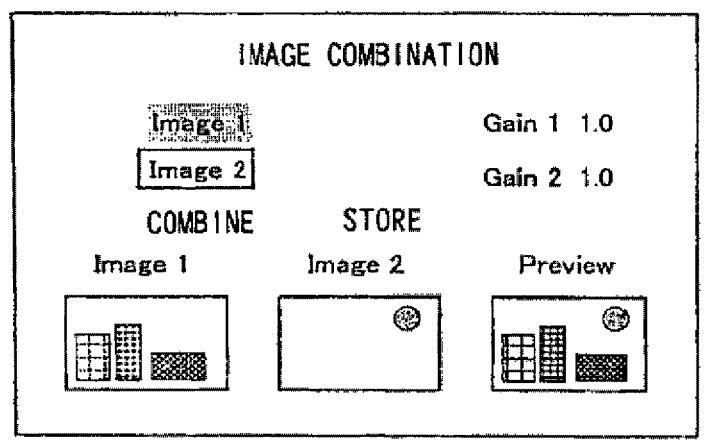
FIG. 11 is a figure showing an example of this image combination screen.

In FIG. 11: as "Image #1", a thumbnail image is displayed that corresponds to the first image; as "Image #2", a thumbnail image is displayed that corresponds to the second image; and, as "Preview", a thumbnail image is displayed that is a combination of the two thumbnail images that correspond to the first image and to the second image.

2. Gain Setting

When an actuation signal is inputted from the cruciform key that constitutes the actuation member 16 to select the gain "Gain #1" that corresponds to the first image, and an actuation signal is inputted to increase or decrease this gain, then the CPU 12A, along with changing the set value for the gain for the first image from its initial value of "1.0" to a value that corresponds to this actuation signal, also sends data that indicates the value of the gain after it has thus been changed to the gain setting circuit 9A. And, by the gain setting circuit 9A setting this set value for the gain after it has been changed to the gain circuit 7A, the thumbnail image that corresponds to the first image is replayed and displayed upon the display device 13A with the gain after it has been changed being applied.

In the same manner, when an actuation signal is inputted from the cruciform key that constitutes the actuation member 16 to select the gain "Gain #2" that corresponds to the second image, and an actuation signal is inputted to increase or decrease this gain, then the CPU 12A, along with changing the set value for the gain for the second image from its initial value of "1.0" to a value that corresponds to this actuation signal, also sends data that indicates the value of the gain after it has thus been changed to the gain setting circuit 9A. And, by the gain setting circuit 9A setting this set value for the gain after it has been changed to the gain circuit 7A, the thumbnail image that corresponds to the second image is replayed and displayed upon the display device 13A with the gain after it has been changed being applied.

Figure 12:
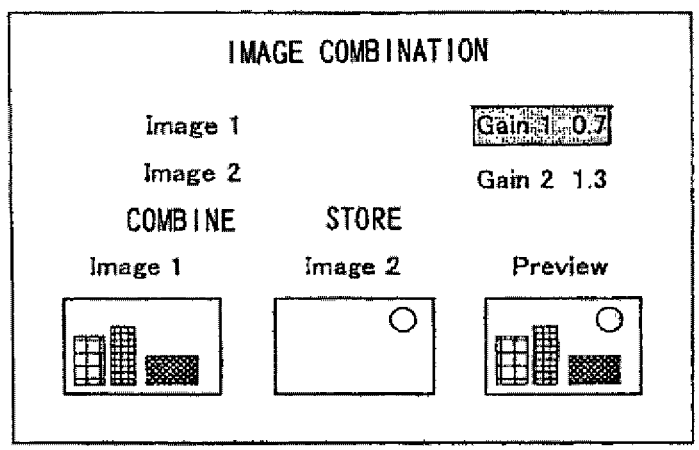
FIG. 12 is a figure showing an example of this image combination screen when the gains have been changed.

FIG. 12 is a figure showing an example of the image combination screen when, respectively, the set value of the gain for the first image has been changed to "0.7", and the set value of the gain for the second image has been changed to "1.3". In FIG. 12, the exposure for the first image (the night scene with buildings) is adjusted to the low side by changing its gain to be less than 1, while the exposure for the second image (the Moon) is adjusted to the high side by changing its gain to be greater than 1.

Figure 13:
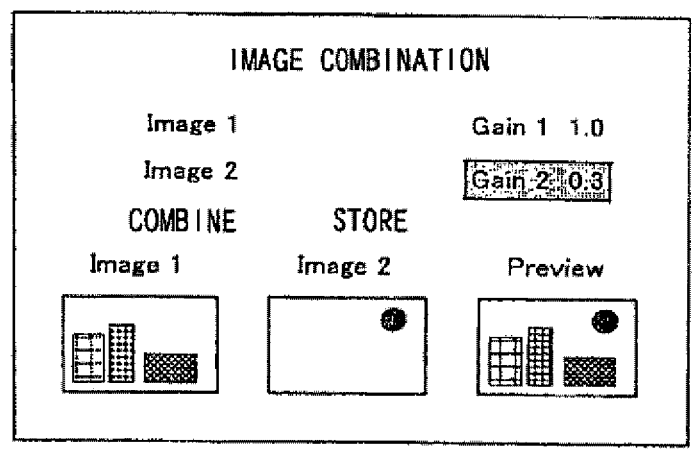
FIG. 13 is a figure showing an example of this image combination screen when the gains have been changed.

FIG. 13 is a figure showing an example of the image combination screen when, respectively, the set value of the gain for the first image has been left the same at "1.0", and the set value of the gain for the second image has been changed to "0.3". In FIG. 13, by the gain for the second image (the Moon) being changed to be less than 1, its exposure is adjusted to the low side.

The combination of the two thumbnail images corresponding to the first image and the second image is performed by the addition circuit 8A described above. This addition circuit 8A adds together the corresponding pixels for the thumbnail image corresponding to the first image, with its gain applied, and for the thumbnail image corresponding to the second image, with its gain applied. The thumbnail image after addition (i.e. after combination) is displayed in real time as "Preview" in FIGS. 11 through 13.

3. Combination

When, in the state in which an image combination screen such as that of FIG. 11 through FIG. 13 is being displayed upon the display device 13A, an actuation signal is inputted from the cruciform key that constitutes the actuation member 16 to select "Combine", and furthermore an actuation signal is inputted from the confirm key so as to indicate confirmation of this selection, then the CPU 12A starts combining the main image that corresponds to the first image and the main image that corresponds to the second image.

The CPU 12A reads out the respective data for these two main images from the recording medium 15, and stores this main image data that has thus been read out in the image memory 5. And the gain circuit 7A applies the respective gains that have been set (i.e. the values that are displayed upon the image combination screen shown in FIG. 11 through FIG. 13) to the main image that corresponds to the first image and to the main image that corresponds to the second image. Moreover, the addition circuit 8A adds together the corresponding pixels for the main image that corresponds to the first image, with its gain applied, and for the main image that corresponds to the second image, with its gain applied. And the data for the main image after addition (i.e. after combination) is stored in the image memory 5 as the combined image data.

4. Storage

When, in the state in which an image combination screen such as that of FIG. 11 through FIG. 13 is being displayed upon the display device 13A, after the combination processing described in {3} above, an actuation signal is inputted from the cruciform key that constitutes the actuation member 16 to select "Store", and furthermore an actuation signal is inputted from the confirm key so as to indicate confirmation of this selection, then the CPU 12A records the combined image data according to {3} as described above from the image memory 5 via the memory 14 upon the recording medium 15. At this time, this is recorded as an image data file that includes the combined image that corresponds to the main image, and a combined image that corresponds to a thumbnail image thereof (that is generated by performing resizing processing to 160×120 pixels from the combined image that corresponds to the main image). The recording format for the data that correspond to the main image is according to the recording format selected upon the electronic camera in the photographic mode.

According to the third embodiment as explained above, the following beneficial operational effects are obtained.

(1) In the image combination mode, this electronic camera combines the first and second images by superimposition. In this image combination processing, {1.} image selection, {2.} image combination processing, {3.} combination, and {4.} storage are performed in order. After the gain setting in {2} described above (after the above described image selection of {1} described above if the initial value of "1.0" for the gain setting value is acceptable), a thumbnail image that is obtained by combining a thumbnail image that corresponds to the first image and a thumbnail image that corresponds to the second image is displayed as "Preview" on the image combination screen (FIG. 11 through FIG. 13). Generally, the thumbnail image that is recorded in an image data file is YCbCr data expressed as 8 bits, and the number of pixels therein is 160×120 (=19,200), that is extremely small as compared to the main images (that include, for example, several millions of pixels). Furthermore, since the thumbnail images have been subjected to interpolation processing and color temperature processing, therefore it is not necessary to perform interpolation processing and color temperature processing for the "Preview" display. Accordingly, since it is possible to display the combined thumbnail image as "Preview" by performing addition (combination) of the thumbnail images together instantaneously, the user is able to check the state of exposure of the image after combination immediately, before performing combination upon the main images.

(2) Since, on the image combination screen (FIG. 11 through FIG. 13), the two thumbnail images that have been selected (the thumbnail images before combination) and a thumbnail image after combination are displayed upon the same screen, accordingly it becomes easy to perform checking of the result of combination.

(3) Since it is arranged for it to be possible to change the gain for the two thumbnail images (the thumbnail images before combination) and to perform pixel multiplication upon all of the pixels that make up these thumbnails, accordingly it is possible to confirm the state of adjustment of the exposure during combination and the result of combination over the entire area of the thumbnail image.

(4) Since the RAW format is used in (1) as the recording format for the main image data, accordingly it is possible to record the main image data after combination in the RAW format as well. By combining (adding together) the data in the RAW format, it is possible to suppress deterioration of the tone characteristics and the like following the combination, as compared with the case of combination (addition) of data in two JPEGs. Furthermore, by recording the main image data after combination in the RAW format as well, it becomes possible to perform further combination of the image after this combination with another image.

(5) Since the "Preview" display is created by performing addition (combination) of the thumbnail images themselves, and since no processing needs to be performed upon the image data files that are recorded upon the recording medium 15, accordingly there is no fear of destruction of the image data files that are the source for the combination.

Although, in the above explanation, an example was disclosed in which the recording format for the main image data is distinguished by the presence or absence of image processing, or by differences in the compression ratio during compression processing, it would also be acceptable to arrange to distinguish it by differences of data size (number of pixels), such as for example L size or S size.

Although it was arranged to perform the combination for the "Preview" display using the data of the thumbnail images included in the image data files, in the case of images for which the data sizes are smaller than those of the main images, it would also be acceptable to perform the combination for the "Preview" display using data other than the thumbnails, such as data generated by sub-sampling or thinning down the data for the main image, or the like.

Although, in this third embodiment, an example was explained of combining the first image and the second image by superimposition of these two images, the number of images that are combined is not limited to being two; it would also be acceptable to combine three images or six images.

Although it was arranged to display six thumbnail images upon the image selection screen (FIG. 9) in two upper and lower rows, the number of thumbnail images that are displayed upon a single screen is not limited to six; it would also be acceptable to display four images or nine images.

In the explanation of this third embodiment, an example has been explained in which the image combination processing is performed by an electronic camera. However, apart from an electronic camera, it would also be acceptable to arrange for the image combination device to be constituted by performing image combination processing with a device that handles electronic images, such as a photo-storager or photo-stand, a PDA, or the like.

Thus, although in the above explanation various embodiments and variant embodiments have been described, the present invention is not to be considered as being limited by these particular details. Other modes are also to be considered as being included within the range of the present invention, provided that they are considered as being within the range of the technical concept of the present invention.

The contents of the disclosure of the following patent applications, upon which priority is claimed, are hereby incorporated by reference:

Japanese Patent Application 2004-310301 (filed on Oct. 26, 2004).

Japanese Patent Application 2005-172215 (filed on Jun. 13, 2005).

Japanese Patent Application 2005-779 (filed on Jan. 5, 2005).

The invention claimed is:

1. A digital camera, comprising:
a shooting completion determination unit that determines whether shooting is completed in a multiple exposure photographic mode for capturing a plurality of images for multiple exposure, and confirms a number of images captured during the multiple exposure photographic mode after determining that shooting is completed in the multiple exposure photographic mode;
a gain calculation unit that, if it is determined by the shooting completion determination unit that shooting in the multiple exposure photographic mode is completed, calculates gains such that a sum of the gains becomes 1, based on the number of the images confirmed by the shooting completion determination unit;
a gain impartation unit that imparts the calculated gains in the plurality of images for multiple exposure respectively; and
a combination unit that creates a multiple exposure photographic image by combining the plurality of images for multiple exposure, after the gains have been imparted by the gain impartation unit.

2. A digital camera according to claim 1, further comprising:
a changeover unit that changes over between effectiveness or ineffectiveness of gain impartation by the gain impartation unit, wherein
when gain impartation is made effective by the changeover unit, the gain impartation unit imparts the gains to the plurality of images that have been captured.

3. A digital camera according to claim 1, further comprising:
an image processing unit that executes various types of image processing upon the multiple exposure photographic image created by the combination unit.

4. A digital camera according to claim 1, further comprising:
a recording control unit that, when performing processing to record the multiple exposure photographic image that has been combined by the combination unit upon a recording medium, records original images before combination that are stored in the storage unit upon the recording medium along with the multiple exposure photographic image.

5. A digital camera according to claim 1, further comprising:
a number of shots for multiple exposure setting unit that sets a number of shots for multiple exposure;
an interruption unit that interrupts image capture before image capture of the number of shots for multiple exposure is completed, wherein:
the shooting completion determination unit determines that shooting is completed in the multiple exposure photographic mode when the number of shots for multiple exposure have been completed or the interruption unit has interrupted image capture before image capture of the number of shots for multiple exposure is completed.

6. A digital camera according to claim 1, wherein:
the gain calculation unit calculates the gains so that the later an image is captured, the smaller a gain for the image becomes.

7. A digital camera according to claim 1, wherein:
the gain calculation unit calculates the gains so that the later an image is captured, the larger a gain for the image becomes.

8. The digital camera according to claim 1, wherein the shooting completion determination unit determines that shooting is completed in the multiple exposure photographic mode when shooting in the multiple exposure photographic mode is interrupted.

9. A digital camera, comprising:
a storage unit that stores a plurality of images captured by an image sensor when a multiple exposure photographic mode is set;
a shooting completion determination unit that determines whether shooting is completed in the multiple exposure photographic mode;
a gain impartation unit that, if it is determined by the shooting completion determination unit that shooting in the multiple exposure photographic mode is completed, calculates gains such that a sum of the gains becomes 1, based on a number of shots captured in the multiple exposure photographic mode, and imparts the calculated gains in the plurality of images;
a combination unit that creates a multiple exposure photographic image by combining the plurality of images, after the gains have been imparted by the gain impartation unit; and
an interrupt command unit that interrupts image capture before image capture of the number of shots for multiple exposure photography is completed, wherein:
when image capture has been interrupted by the interrupt command unit before image capture of the number of shots for multiple exposure photography is completed, the gain impartation unit calculates gains such that a sum of the gains becomes 1, based upon a number of shots that have been captured up to a point of interruption, and imparts the calculated gains in the plurality of images up to the point of interruption; and the combination unit combines the plurality of images that have been captured up to the point of interruption, to create a multiple exposure photographic image.

\* \* \* \* \*